(12) United States Patent
Rarick

(10) Patent No.: US 7,963,501 B2
(45) Date of Patent: Jun. 21, 2011

(54) BUTTERFLY VALVE

(75) Inventor: Gregory Rarick, Kutztown, PA (US)

(73) Assignee: Boyesen Engineering, Lenhartsville, PA (US)

( * ) Notice: Subject to any disclaimer, the term of this patent is extended or adjusted under 35 U.S.C. 154(b) by 354 days.

(21) Appl. No.: 12/186,151

(22) Filed: Aug. 5, 2008

(65) Prior Publication Data

US 2010/0031921 A1    Feb. 11, 2010

(51) Int. Cl.
 *F16K 41/00* (2006.01)
(52) U.S. Cl. ......................................... 251/127; 251/305
(58) Field of Classification Search .................. 251/118, 251/127, 304, 305; 123/337
See application file for complete search history.

(56) References Cited

U.S. PATENT DOCUMENTS

| | | | |
|---|---|---|---|
| 1,841,695 A | 1/1932 | Anderson | |
| 1,857,477 A | 5/1932 | Ritter | |
| 2,105,343 A | 1/1938 | Briggs | |
| 2,985,524 A | 5/1961 | Jacobus | |
| 3,176,704 A | 4/1965 | De Palma | |
| 3,934,851 A | 1/1976 | Illing | |
| 4,420,438 A | 12/1983 | Goosen | |
| 4,479,510 A * | 10/1984 | Bey | 137/625.31 |
| 4,996,769 A | 3/1991 | Bongart | |
| 5,218,984 A * | 6/1993 | Allen | 137/1 |
| 5,342,555 A | 8/1994 | Edmonston | |
| 5,400,825 A * | 3/1995 | Gethmann et al. | 137/625.32 |
| 6,371,068 B2 | 4/2002 | Taylor | |
| 6,439,540 B1 | 8/2002 | Tse | |
| 6,491,020 B2 * | 12/2002 | Kotchi et al. | 123/337 |
| 6,824,119 B2 * | 11/2004 | Conley et al. | 251/305 |
| 6,923,157 B2 * | 8/2005 | Torii et al. | 123/337 |
| 7,117,845 B2 * | 10/2006 | Iwaoka et al. | 123/337 |
| 7,146,961 B1 | 12/2006 | Westcott | |
| 2005/0172924 A1 | 8/2005 | Simon | |
| 2007/0102661 A1 | 5/2007 | Isogai et al. | |

* cited by examiner

*Primary Examiner* — John K Fristoe, Jr.
(74) *Attorney, Agent, or Firm* — Howson & Howson LLP

(57) ABSTRACT

A butterfly valve including a housing having a hollow passage defining a flow path and a shaft mounted to the housing and extending transversely across the flow path. The shaft defines an axis of rotation for a butterfly valve element carried on the shaft. The valve element can be rotated about the axis between an open position permitting flow along the flow path and a closed position restricting flow along the flow path. The butterfly valve element includes a thin, substantially disc-shaped, flow-regulating plate having front and rear faces and a flow-straightening vane extending from one of the faces transversely relative to the shaft. The vane is solid and extends substantially to the wall of the hollow passage thereby defining separate non-communicating flow channels on opposite sides thereof for reducing flow turbulence and for straightening and accelerating flow across the plate.

18 Claims, 5 Drawing Sheets

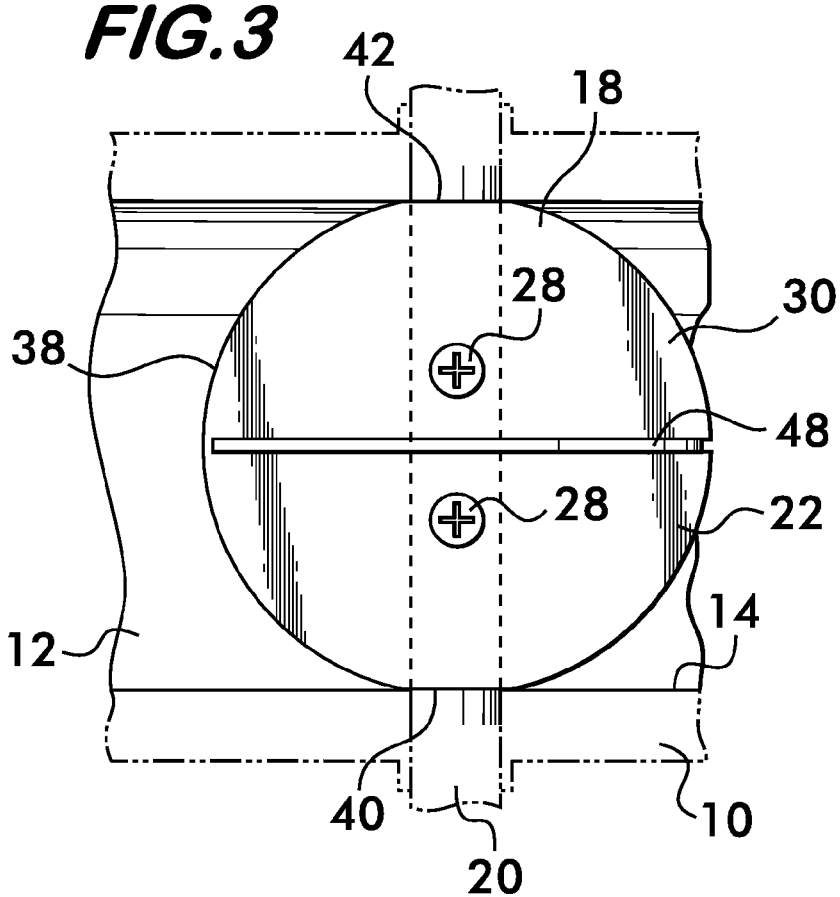
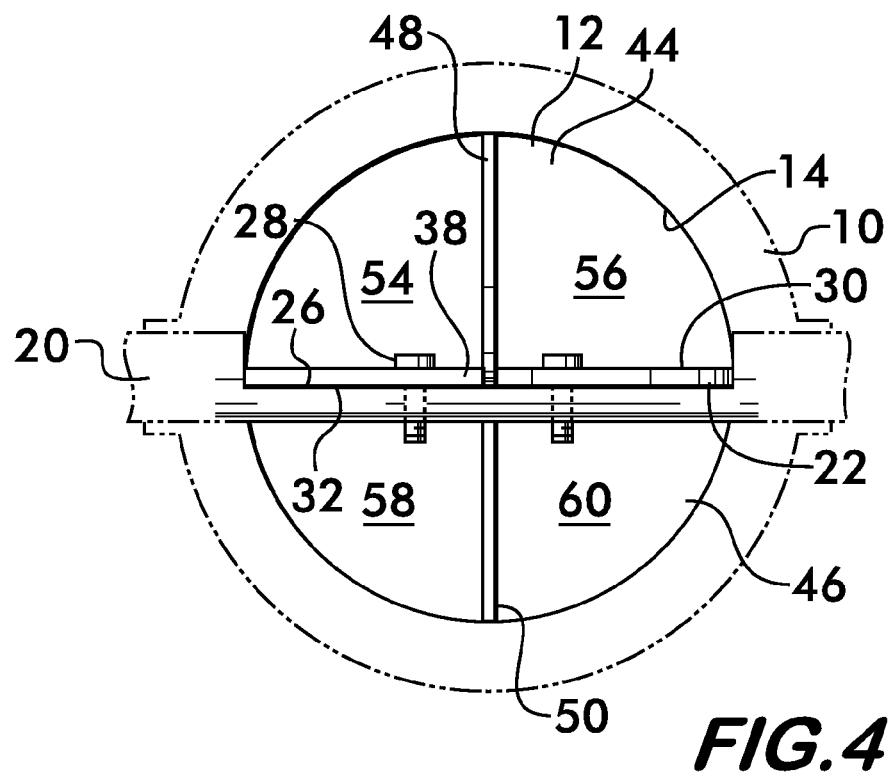

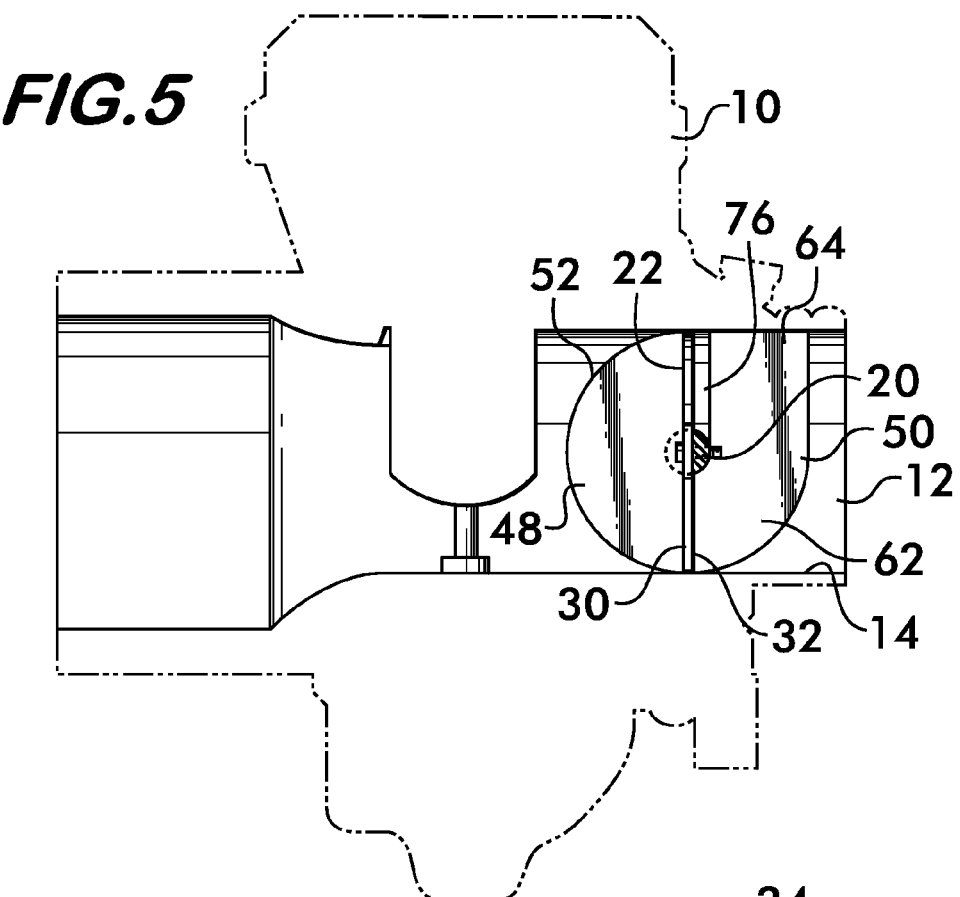
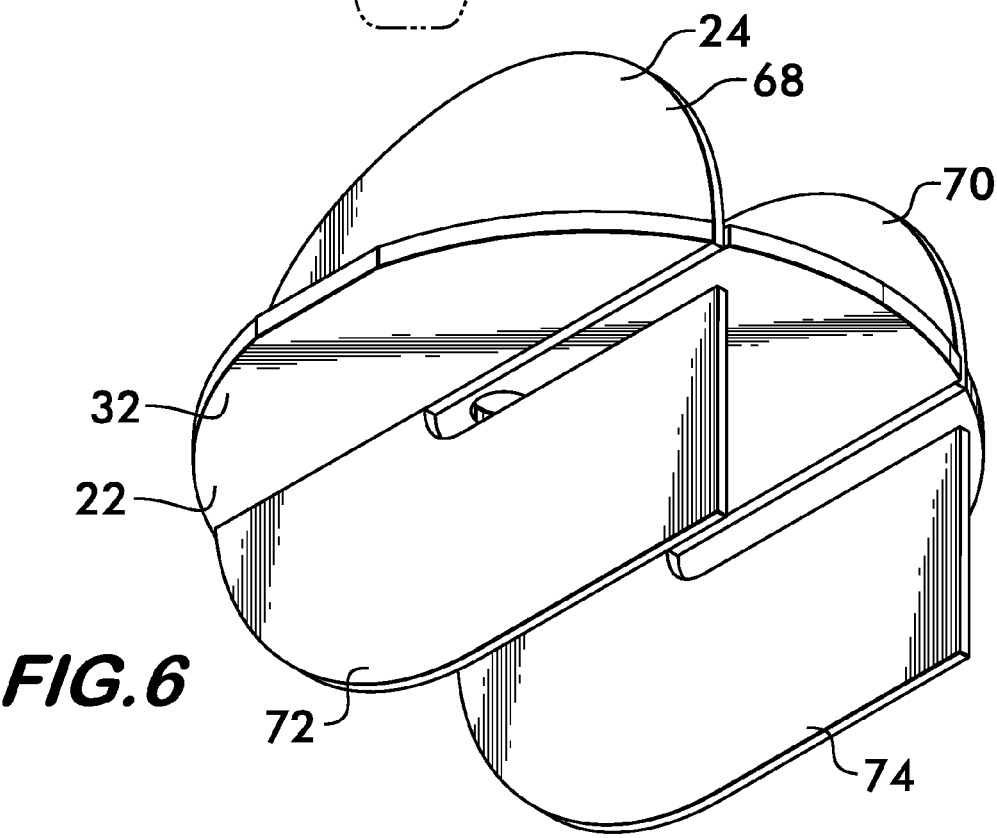

FIG.7
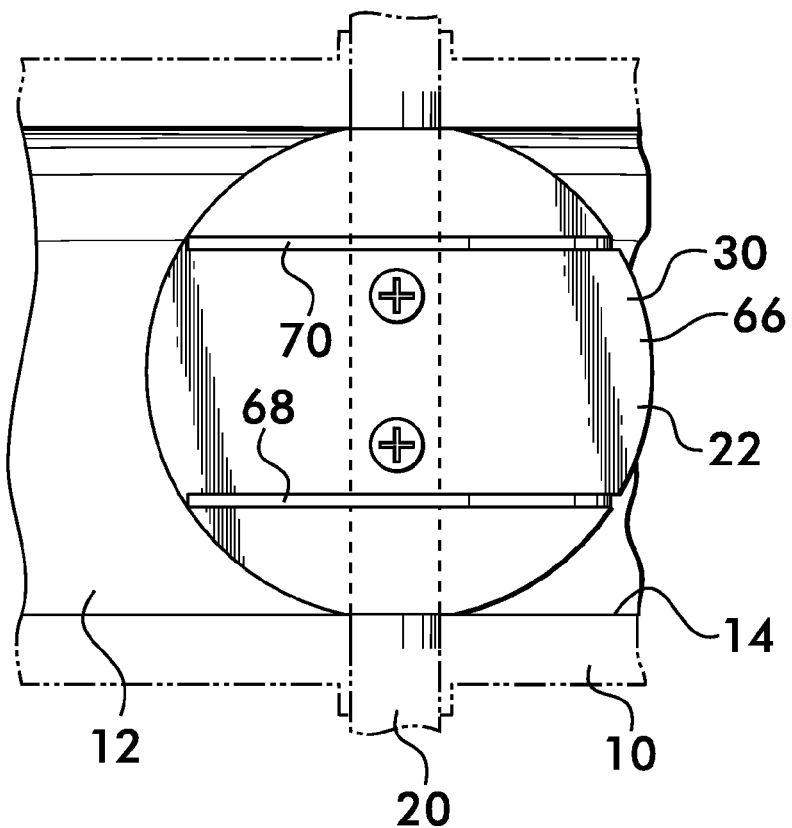
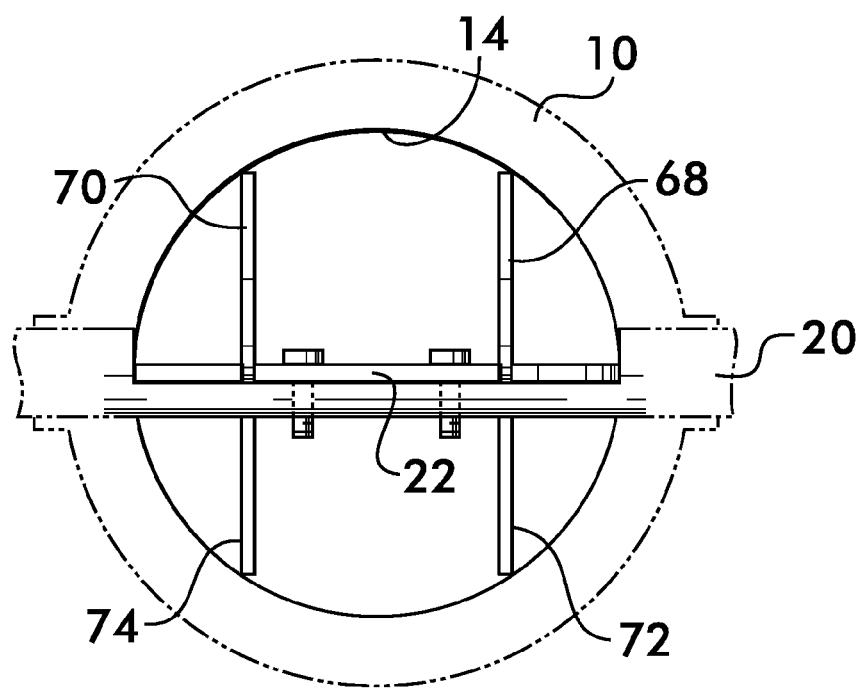
FIG.8

BUTTERFLY VALVE

BACKGROUND OF THE INVENTION

The present invention relates to a butterfly valve element mounted on a shaft and rotatable to regulate flow of a fluid in a flow passage, and more particularly, the present invention relates to a butterfly valve element used to regulate air in an air inlet conduit of a throttle body or carburetor of an internal combustion engine.

A conventional butterfly valve includes a disc-shaped plate positioned in a duct, conduit, or throat, for rotation about a transverse axis defined by a shaft. Rotation of the plate in the passage increases or decreases the amount of restriction to fluid flow and thereby controls fluid flow through the duct, conduit or throat. Some examples of butterfly valves are disclosed by U.S. Pat. Nos. 1,857,477 issued to Ritter; U.S. Pat. No. 1,841,695 issued to Anderson; U.S. Pat. No. 2,105,343 issued to Briggs; U.S. Pat. No. 3,176,704 issued to De Palma; U.S. Pat. No. 4,420,438 issued to Goosen; U.S. Pat. No. 4,996,769 issued to Bongert; U.S. Pat. No. 6,371,068 B2 issued to Taylor; and U.S. Pat. No. 6,439,540 B1 issued to Tse and by U.S. Patent Application Publication Nos. 2007/0102661 A1 of Isogai et al. and 2005/0172924 A1 of Simon.

U.S. Pat. No. 5,342,555 issued to Edmonston and U.S. Patent Application Publication No. 2005/0172924 A1 of Simon disclose devices that are used to straighten air flow upstream and/or downstream of air-regulators within carburetors and throttle bodies. For example, both references disclose a conventional carburetor having an air inlet conduit and a slide-type air regulator typically used on motorcycles or all-terrain vehicles (ATVs), and Simon discloses a fuel-injector style throttle body having an air conduit and butterfly valve-type air regulator. The air flow straightening devices are mounted in a stationary position on either end of the air conduit for reducing air turbulence within the carburetor or throttle body directly ahead of, or behind, the air regulator. These devices are used to straighten and accelerate the air flow through the carburetor or throttle body for purposes of increasing response, power and torque.

Although the valve assemblies disclosed in the above referenced patents and application publications may be satisfactory for their intended purpose, there is a need for a butterfly valve that reduces air turbulence and that straightens and accelerates air flow across a butterfly valve element. The butterfly valve can be used in a throttle body for providing increased air speed and greater torque. In addition, the butterfly element should be easy to install within a throttle body, including retrofits of existing throttle bodies, and should require only a minimum of skill and labor to install.

BRIEF SUMMARY OF THE INVENTION

The present invention is directed to a butterfly valve including a housing having a hollow passage defining a flow path and a shaft mounted to the housing and extending transversely across the flow path. The shaft defines an axis of rotation for a butterfly valve element carried on the shaft. The valve element can be rotated about the axis between an open position permitting flow along the flow path and a closed position restricting flow along the flow path. The butterfly valve element includes a thin, substantially disc-shaped, flow-regulating plate having front and rear faces and a flow-straightening vane extending from one of the faces transversely relative to the shaft. The vane is solid and extends substantially to the wall of the hollow passage thereby defining separate non-communicating flow channels on opposite sides thereof for reducing flow turbulence and for straightening and accelerating flow across the plate.

BRIEF DESCRIPTION OF THE DRAWINGS

The features and advantages of the present invention should become apparent from the following description when taken in conjunction with the accompanying drawings, in which:

FIG. 3 is a cross-sectional view taken horizontally along line 3-3 of FIG. 2;

FIG. 4 is a cross-sectional view taken horizontally along line 4-4 of FIG. 2;

FIG. 5 is cross-sectional view of the throttle body of FIG. 2 with the butterfly valve element of FIG. 1 disposed in a fully-closed throttle position according to the present invention;

FIG. 6 is a perspective view of a second embodiment of a butterfly valve element according to the present invention;

FIG. 7 is a top plan view of the butterfly valve element of FIG. 6;

FIG. 8 is a front elevational view of the butterfly valve element of FIG. 6;

DETAILED DESCRIPTION OF THE INVENTION

Figure 1:
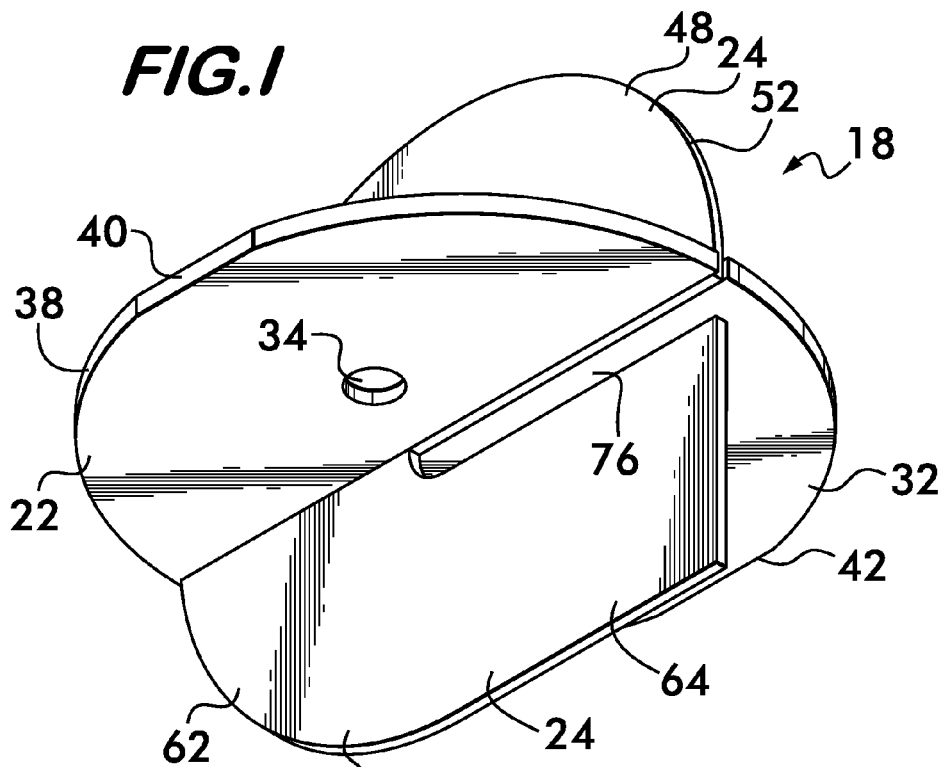
FIG. 1 is a perspective view of a first embodiment of a butterfly valve element according to the present invention.
Figure 2:
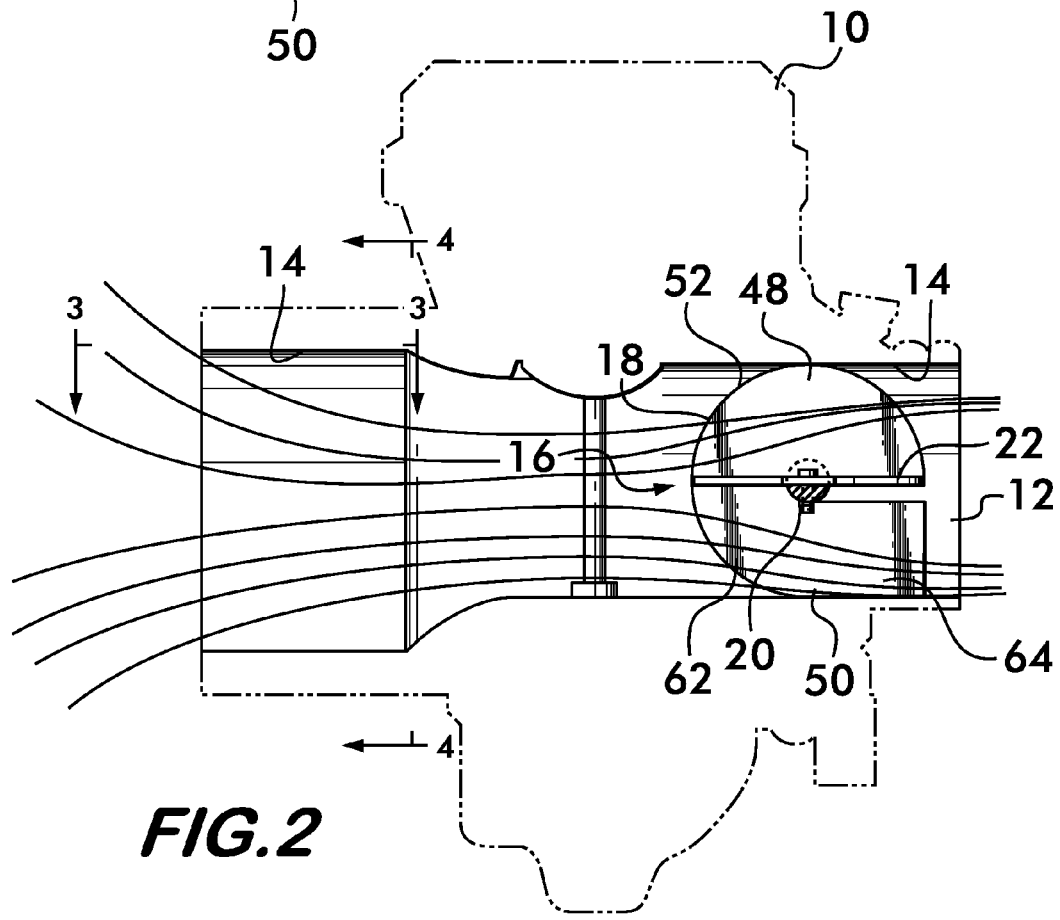
FIG. 2 is cross-sectional view of the butterfly valve element of FIG. 1 mounted within a throttle body and disposed in a full throttle position according to the present invention.
Figure 10:
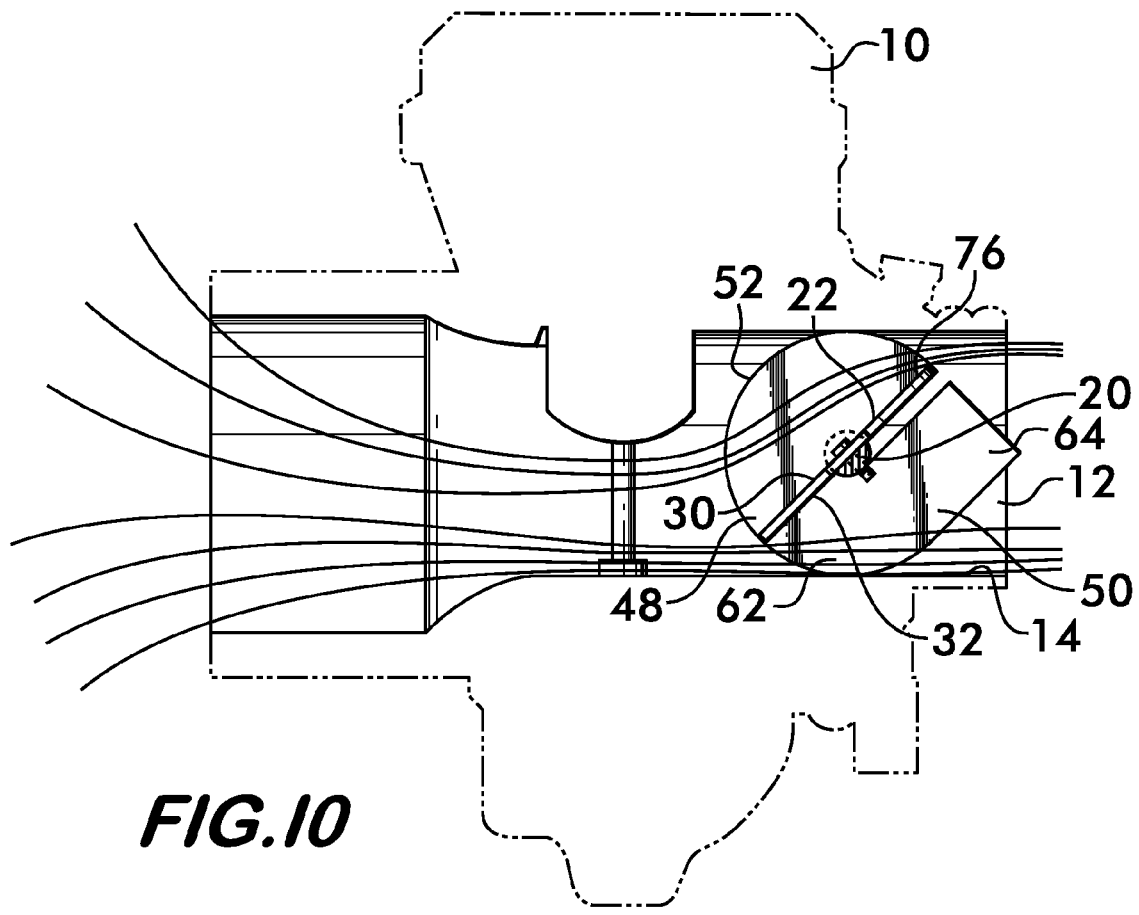
FIG. 10 is cross-sectional view of the butterfly valve element of FIG. 1 mounted within a throttle body and disposed in a part throttle position according to the present invention.

FIGS. 2, 5 and 10 illustrate in phantom the outline of a part of a fuel-air mixing assembly of an internal combustion engine. For example, the phantom outline can be that of a housing 10 of a fuel-injector throttle body, a carburetor, or the like. The housing 10 defines an internal conduit, duct, or throat 12 providing an air intake passage through the throttle body or carburetor. As illustrated for instance in FIG. 4, the passage 12 can be defined by a substantially tubular or circular closed inner wall surface 14 defining a bore in which an air regulator 16 is mounted.

The air regulator 16 of the present invention includes a butterfly valve element 18 carried on a shaft 20. As discussed in greater detail below, the valve element 18 includes an air-regulating plate 22 and one or more integral air-straightening vanes 24 carried by and rotatable with the plate 22.

The shaft 20 is mounted to the housing 10, extends transversely across the passage 12 at a mid-height, or diameter, of the tubular passage 12, and defines an axis of rotation "A" about which the butterfly valve element 18 can be rotated. Preferably, the shaft 20 includes a recessed flat 26 on which the butterfly element 18 can be seated and mounted, for instance, with a pair of fasteners 28 or the like. This is best illustrated in FIG. 4. The use of a recess ensures that the axis of rotation "A" extends through the plate 22. As an alternative, the shaft can be provided with a centrally-located slot instead of a flat 26. In addition, preferably the shaft 20 extends centrally and transversely across a diameter of the disc-shaped plate 22 of the butterfly element 18 so that the axis of rotation "A" extends along the diameter of the plate 22. This is best illustrated in FIG. 3.

The relatively-thin, substantially disc-shaped plate 22 of the butterfly valve element 18 has front and rear faces, 30 and 32, a substantially uniform thickness "T", a pair of fastener-receiving apertures 34, and a substantially circular peripheral edge 38, except for a pair of opposed flats, 40 and 42. The flats, 40 and 42, mate with the sides of the recessed flat 26 of the shaft 20 to enable ready installation of the butterfly valve element 18 on the shaft 20. Preferably, the diameter of the plate 22 closely matches the diameter of the bore defined by the inner wall surface 14 of the passage 12. This is because the clearance between the plate 22 and the inner wall surface 14 must be very small (a few hundredths of a millimeter) to avoid significant air leaks through the gap. As an example, see the close fit of plate 22 relative to surface 14 in FIG. 5.

The plate 22 is rotated as the shaft 20 is turned. For example, FIGS. 2 and 4 show a fill-throttle or full-open position in which the front and rear faces, 30 and 32, of the plate 22 are disposed substantially parallel to the direction of air flow through the passage 12. Thus, the air flow in the passage 12 sees only the peripheral edge 38 of the plate 22 and is permitted to flow over and under the front and rear faces, 30 and 32, of the plate 22 without significant restriction from the butterfly valve element 18. In the full-throttle or open position, the plate 22 simply divides the passage 12 into a semi-circular upper channel 44 and a semi-circular lower channel 46. See FIG. 4.

The shaft 20 can be turned for about one-quarter of a turn from the full-throttle position of FIG. 2 to a closed-throttle position illustrated in FIG. 5. Thus, in comparing FIGS. 2 and 5, the plate 22 has been rotated about 90° counter-clockwise from a substantially horizontal position to a substantially vertical position. As discussed above, since the size of the plate 22 substantially matches the size of the bore of the passage 12 at the location of the plate 22, the plate 22 substantially cuts off all flow of air through the passage 12.

Of course, the shaft 20 can be turned to position the plate 22 at an intermediate position such that the front and rear faces, 30 and 32, of the plate 22 are inclined at an angle relative to the direction of air flow through the passage 12. This represents a partial throttle position and is illustrated in FIG. 10. The greater the incline of the plate 22 relative to the direction of air flow, the greater the restriction to air flow. Thus, a steeply inclined plate 22 would represent a low speed throttle position and a small incline would represent a mid or high speed throttle position.

Unlike conventional butterfly valve elements that consist only of a flat plate, the butterfly valve element 18 of the present invention includes one or more air-straightening vanes 24. For example, referring to the embodiment illustrated in FIGS. 1-5, the butterfly valve element 18 includes a first vane 48 provided as a thin solid plate extending transversely, preferably perpendicularly, from the front face 30 of the plate 22 and a second vane 50 provided as a thin solid plate extending transversely, preferably perpendicularly, from the rear face 32 of the plate 22. As shown in FIGS. 2 and 5, the vanes 48 and 50 extend in opposite directions from the plate 22, are substantially flat and co-planar, and extend along a diameter of the plate 22 in a direction perpendicular to the shaft 20.

As one example of the shape of a vane 24, the vane 48 is semicircular having an arcuate peripheral edge 52 formed at a radius that is substantially equal to a radius of the plate 22. Accordingly, as best illustrated in FIGS. 2, 4 and 5, the peripheral edge 52 of the vane 48 extends closely to the inner wall surface 14 of the passage 12 throughout the extent of rotation of the butterfly valve element 18. Thus, in the full throttle position shown in FIG. 4, the vanes 48 and 50 divide the upper and lower semi-circular channels, 44 and 46, into separate, substantially non-communicating, quadrant-shaped, air flow channels, 54, 56, 58 and 60. Thus, the combination of the vanes 48 and 50 and the plate 22 present a cruciform-type structure to the air flow. This structure reduces turbulence of the air flow and straightens air flow to provide a more consistent air flow at greater speeds along the plate 22 of the butterfly valve element 18.

As an alternative non-semi-circular shape of a vane 24, the vane 50 includes a pie-shaped section 62 and a square section 64. Since the butterfly valve element 18 is only required to rotate about 90° about the axis "A", only the arcuate peripheral edge of the pie-shaped section 62 of the vane 50 extends adjacent the inner wall surface 14 of the passage 12. Thus, the square section 64 does not prevent the required amount of rotation and can be used as a rotation limiter as shown in FIG. 5. The square section 64 also provides greater surface area and thereby provides a greater degree of straightening to the air flow. As an alternative to the embodiment illustrated in FIGS. 1-5, both vanes can be semi-circular like that of vane 48 or both vanes can have a square or other enlarged section like that of vane 50.

Accordingly, the vanes 48 and 50 straighten and accelerate air flow adjacent, along and past the butterfly valve element 18 regardless of whether the element 18 is in a full-throttle or an inclined, partial throttle position. The vanes 24 are carried on the plate 22 and rotate therewith as a single integral unit.

Preferably, the vanes are solid with the exception of a slot 76 formed in the vane 50 adjacent the rear side 32 of the plate 22. The slot 76 enables ready insertion of the butterfly valve element 18 onto the shaft 20. During installation, the shaft 20 is received in the slot 76 which permits the butterfly valve element 18 to be properly positioned on the recessed flat 26 of the shaft 20. Thereafter, the fasteners 28 are used to secure the element 18 to the shaft 20. Accordingly, this arrangement permits conventional butterfly valve plates to be removed and replaced with the butterfly valve element 18 of the present invention.

A second embodiment of a butterfly valve element 66 is shown in FIGS. 6-8. In this embodiment, the butterfly valve element 66 includes a plate 22 with four vanes 24. The vanes include a pair of parallel, spaced-apart vanes 68 and 70 extending from the front face 30 of the plate 22 and a pair of parallel, spaced-apart vanes 72 and 74 extending from the rear face 32 of the plate 22. For example, see FIG. 8. The vanes extend to the inner wall surface 14 defining the bore of the passage 12 and thereby provide six separate, substantially non-communicating, air flow channels through the bore for purposes of straightening and accelerating air flow through the passage 12.

Other alternatives are also possible. For example, any number of vanes can extend from the front or rear faces of the plate 22 to define any number of separate air flow channels. Also, vanes can extend from only one face and not the other, or a different number of vanes can extend from one face of the plate relative to the other. The plate and vane combination can be made of metal, plastic or composite materials.

Figure 9:
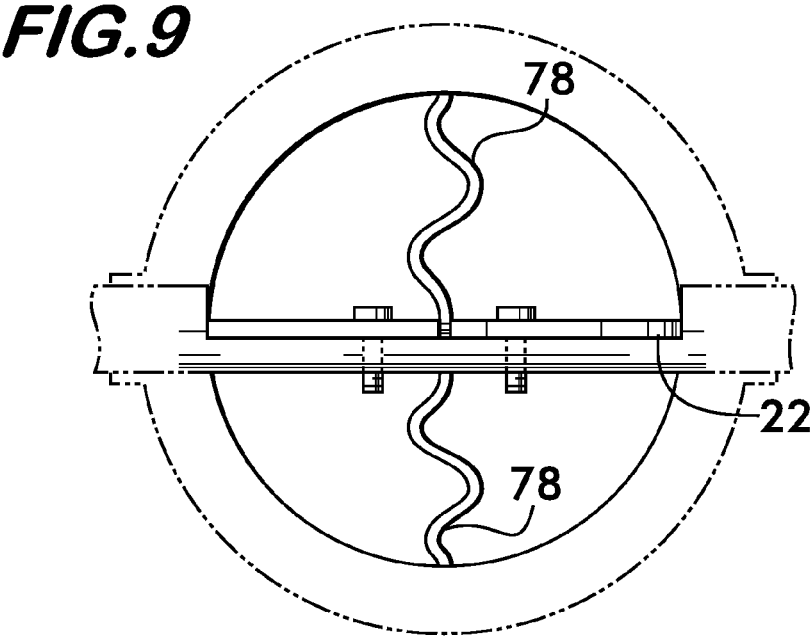
FIG. 9 is a front elevational view of a third embodiment of a butterfly valve element according to the present invention.

Another contemplated alternative is for the vanes to be corrugated, grooved, wavy or otherwise not flat. For example, see FIG. 9. Thus, the vanes 78 can have undulations defining grooves with peaks and valleys. The grooves can extend parallel to the plate 22 so that when the plate 22 is in the full throttle position, the air flow sees the grooves thereby providing additional air flow straightening without further air flow restriction. In addition, in the low-speed part-throttle position, the air flow would see at least a part of the walls defining the grooves thereby increasing air speed past the butterfly valve element.

While preferred butterfly valves have been described in detail, various modifications, alterations, and changes may be made without departing from the spirit and scope of the present invention as defined in the appended claims.

The invention claimed is:

1. A butterfly valve, comprising:
a housing having a hollow passage defining a flow path;
a shaft mounted to said housing, extending transversely across said flow path, and defining an axis of rotation; and
a butterfly valve element carried on said shaft for rotation about said axis between an open position for permitting flow along said flow path and a closed position for restricting flow along said flow path;
said butterfly valve element including a substantially disc-shaped flow-regulating plate having front and rear faces and a flow-straightening vane extending from said front face transversely relative to said shaft so that said vane defines separate non-communicating flow channels on opposite sides thereof for straightening and accelerating flow across said plate;
said butterfly valve element including a second vane extending from said rear face; wherein said hollow passage of said housing includes an inner wall surface; and wherein the flow-straightening vane includes at least one section that extends substantially to said inner wall surface with little clearance therebetween.

2. A butterfly valve according to claim 1, wherein said inner wall surface defines a bore where said shaft extends across said passage, and wherein a diameter of said plate closely matches a diameter of said bore so that flow is substantially blocked when said butterfly valve element is in said closed position.

3. A butterfly valve according to claim 2, wherein said at least one section is substantially pie-shaped having an arcuate peripheral edge.

4. A butterfly valve according to claim 3, wherein said plate extends in a first plane and said flow-straightening vane extends in a second plane, and wherein said second plane is substantially perpendicular to said first plane and substantially perpendicular to said axis of rotation.

5. A butterfly valve according to claim 4, wherein said flow-straightening vane extends along a diameter of said plate and wherein a radius of said pie-shaped section of said vane is substantially the same as a radius of said plate.

6. A butterfly valve according to claim 1, wherein at least a pair of spaced-apart vanes extends from one of said front and rear faces of said plate.

7. A butterfly valve, comprising:
a housing having a hollow passage defining a flow path;
a shaft mounted to said housing, extending transversely across said flow path, and defining an axis of rotation; and
a butterfly valve element carried on said shaft for rotation about said axis between an open position for permitting flow along said flow path and a closed position for restricting flow along said flow path;
said butterfly valve element including a substantially disc-shaped flow-regulating plate having front and rear faces and a flow-straightening vane extending from one of said faces transversely relative to said shaft so that said vane defines separate non-communicating flow channels on opposite sides thereof for straightening and accelerating flow across said plate;
said vane including a slot extending along said plate permitting said butterfly valve element to be received on said shaft.

8. A butterfly valve according to claim 7, wherein said vane is a thin upstanding plate with undulations defining grooves.

9. A butterfly valve according to claim 8, wherein said grooves extend substantially parallel to said plate.

10. A throttle body of an internal combustion engine, comprising:
an inner wall surface defining an air intake passage;
a shaft extending transversely across said air intake passage and defining an axis of rotation; and
a butterfly valve element carried on said shaft for rotation about said axis between an open position for permitting flow along said flow path and a closed position for restricting flow along said flow path;
said butterfly valve element including a thin, substantially disc-shaped flow-regulating plate having front and rear faces and at least one flow-straightening vane extending from one of said faces transversely relative to said shaft so that said vane defines separate non-communicating air flow channels on opposite sides thereof for reducing air turbulence and for straightening and accelerating air flow across said plate; and
said vane including a slot extending along and parallel to said plate permitting said butterfly valve element to be received on said shaft.

11. A throttle body according to claim 10, wherein said at least one flow-straightening vane includes at least one section thereof that extends substantially to said inner wall surface with little clearance therebetween thereby defining said separate non-communicating flow channels.

12. A throttle body according to claim 10, wherein said plate extends in a first plane and said vane extends in a second plane, and wherein said second plane is substantially perpendicular to said first plane and substantially perpendicular to said axis of rotation.

13. A throttle body according to claim 12, wherein said vane extends along a diameter of said plate and includes an arcuate outer edge formed at a radius that is substantially the same as a radius of said plate.

14. A throttle body according to claim 10, wherein said at least one flow-straightening vane includes a plurality of separate flow-straightening vanes that extend integrally from said plate and that each includes at least one section thereof that extends substantially to said inner wall surface with little clearance therebetween thereby defining said separate non-communicating flow channels.

15. A throttle body according to claim 14, wherein said vanes define at least two separate non-communicating flow channels across each of said front and rear faces.

16. A throttle body according to claim 14, wherein said vanes define at least three separate non-communicating flow channels across at least one of said front and rear faces.

17. A throttle body according to claim 14, wherein said at least one section of each of said vanes is substantially pie-shaped having an arcuate peripheral edge permitting rotation of said butterfly valve element.

18. A throttle body according to claim 10, wherein said vane is thin upstanding plate with undulations.

* * * * *